United States Patent
Okada

(10) Patent No.: US 9,880,073 B2
(45) Date of Patent: Jan. 30, 2018

(54) TIRE TRAVELING TEST DEVICE

(71) Applicant: Kobe Steel, Ltd., Hyogo (JP)

(72) Inventor: Toru Okada, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 121 days.

(21) Appl. No.: 14/787,672

(22) PCT Filed: May 13, 2014

(86) PCT No.: PCT/JP2014/062669
§ 371 (c)(1),
(2) Date: Oct. 28, 2015

(87) PCT Pub. No.: WO2014/196317
PCT Pub. Date: Dec. 11, 2014

(65) Prior Publication Data
US 2016/0084738 A1  Mar. 24, 2016

(30) Foreign Application Priority Data
Jun. 3, 2013  (JP) .................................. 2013-117089

(51) Int. Cl.
G01M 15/00 (2006.01)
G01M 17/02 (2006.01)
(52) U.S. Cl.
CPC ................. *G01M 17/022* (2013.01)
(58) Field of Classification Search
USPC .......................................... 73/8, 118.01, 146
See application file for complete search history.

(56) References Cited

U.S. PATENT DOCUMENTS

| 4,324,128 A * | 4/1982 | Langer .................. B65G 15/60 |
| | | 73/146 |
| 4,344,324 A * | 8/1982 | Langer ................ G01M 17/022 |
| | | 198/837 |
| 4,458,527 A * | 7/1984 | McFarland et al. ................... G01M 17/022 |
| | | 73/146 |

FOREIGN PATENT DOCUMENTS

| JP | S55-128140 A | 10/1980 |
| JP | S56-139849 A | 10/1981 |
| JP | S62-012838 U | 1/1987 |

(Continued)

OTHER PUBLICATIONS

Machine Language Translation of Detailed Description of JPH03-152435A, Support Arrangement for Load for Flat-Surface Running Way, Date: Jun. 28, 1991, Publisher: JPO and INPIT, pp. 4.*

(Continued)

*Primary Examiner* — Manish S Shah
*Assistant Examiner* — Roger Hernandez-Prewitt
(74) *Attorney, Agent, or Firm* — Studebaker & Brackett PC

(57) ABSTRACT

A tire traveling test device has a belt that horizontally spans between two drums and a load support device that supports a flat surface of the belt from a lower surface side of the belt. The load support device is provided with a liquid supply means that supplies support liquid between the load support device and the belt and supports the belt from below. The liquid supply means is provided with a plurality of supply holes from which support liquid can be discharged between the load support device and the belt. Additionally, the liquid supply means can adjust the flow rate of the support liquid discharged from the supply holes on the basis of the fluid pressure, which changes according to the tire contact state.

6 Claims, 12 Drawing Sheets

(56) References Cited

FOREIGN PATENT DOCUMENTS

| | | |
|---|---|---|
| JP | S62-225495 A | 10/1987 |
| JP | H02-238342 A | 9/1990 |
| JP | H03-152435 A | 6/1991 |
| JP | H04-109349 U | 9/1992 |
| JP | H11-173953 A | 7/1999 |
| JP | 2009-198380 A | 9/2009 |
| JP | 2012-107744 A | 6/2012 |
| WO | 2009/104697 A1 | 8/2009 |

OTHER PUBLICATIONS

International Search Report issued in Application No. PCT/JP2014/062669, dated Aug. 12, 2014, 2 pages.
Written Opinion issued in Application No. PCT/JP2014/062669, dated Aug. 12, 2014, Author: Tanigaki Keiji, 4 pages.

* cited by examiner

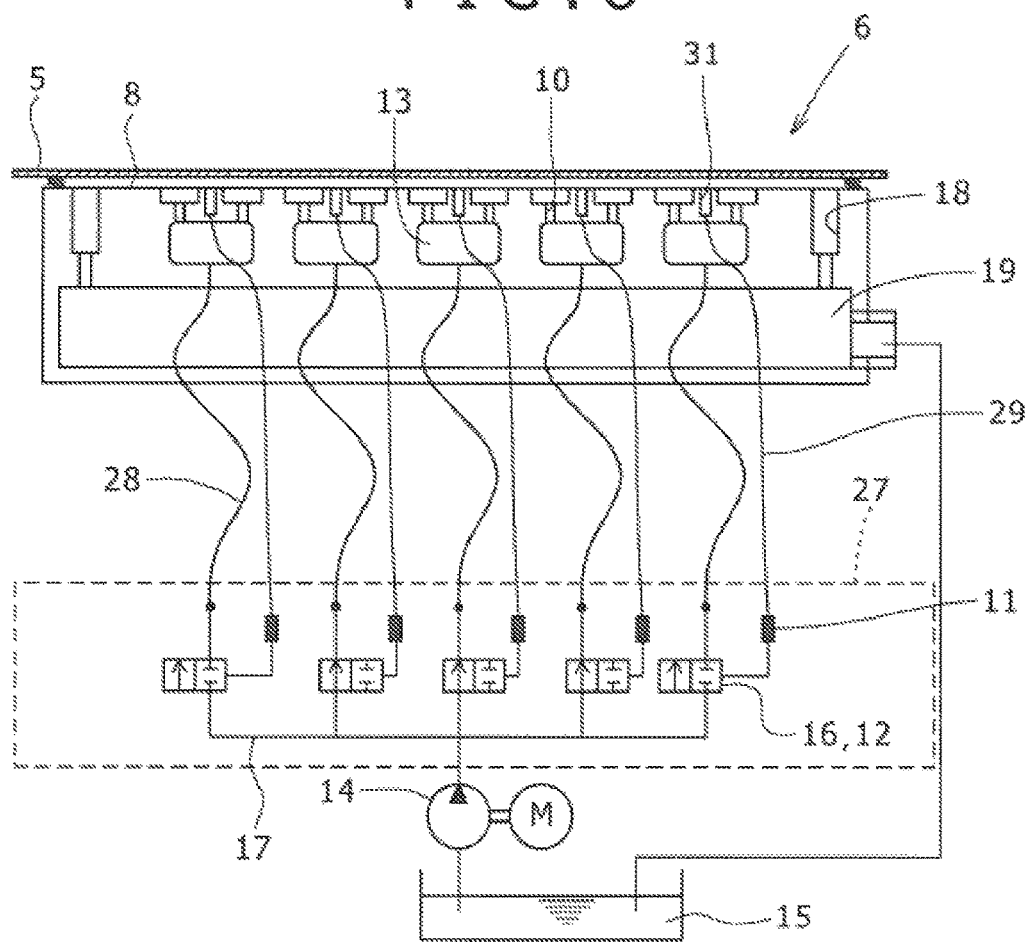

TIRE TRAVELING TEST DEVICE

TECHNICAL FIELD

The present invention relates to a tire traveling test device.

BACKGROUND ART

Conventionally, as a tire traveling test device which evaluates traveling property of tires, those using an endless flat belt (herebelow referred to as belt) which imitates a flat road surface have been known. In such traveling test devices, a belt is spanned over two drums. Specifically, the belt mentioned above is spanned over two drums in a manner separated into upper side and lower side, the upper side belt constituting a ground contact face for tire which allows a tire a ground contact. On the other hand, the belt, in the back side of this ground contact face for tire, is provided with a load support device which prevents the belt from bending, and supports a tire load.

The load support device is configured to have a structure in which a support liquid, such as a pressurized water or oil, is supplied between the upper face (belt supporting face) of this load support device and the lower face of the belt, in order to smoothly support running of the belt. That is, the load support device comprises a function to support the belt by supplying the support liquid to the contacting face of the belt to thereby float the belt.

As a traveling test device which adopt the technique of floating a belt from a load support device by use of a pressurized support liquid in this way, those disclosed in the Patent Document 1 and Patent Document 2 have been known.

These traveling test devices of the Patent Document 1 and the Patent Document 2 both have a structure which supplies the support liquid by providing plural circular holes on the upper face of the load support device, and blowing out the pressurized support liquid from these plural circular holes. In a case of adopting such method of supplying a support liquid, the circular holes will be closed in those regions where a tire is in ground contact, to suppress the amount of the support liquid to be blown out according to a ground contacting pressure, in the upper face of the load support device. However, the support liquid easily leaks out from the circular holes disposed in a region where a tire is not in ground contact, or in a region where a ground contact pressure of the tire is low. This causes, further enhanced by a force of the support liquid blown out from the circular holes, the belt to be further floated from the upper face of the load support device, and the floating of the belt becomes further excessive to require a significant amount of support liquid to be continuously supplied, which brings about a lowering of supplying pressure of the support liquid, or causes an increase of energy loss.

In order to lower such energy loss, in the traveling test device of the Patent Document 1, plural chambers are constructed in a liquid pressure receiving unit of the belt so as to be able to supply the each chamber with support liquid each different in liquid pressure. In such a structure, it is possible to control a liquid pressure of the support liquid to be high in a part where a tire is in ground contact, and to control a liquid pressure of the support liquid to be low in a part where a tire is not in ground contact, and accordingly, it becomes possible to avoid a wasteful use of the support liquid and control the energy loss to be small.

The traveling test device of the Patent Document 2 is provided with an orifice between circular holes which blow out a pressurized support liquid and a supply unit which supplies these circular holes with a high pressure support liquid. By providing such an orifice, a wasteful blowing out of the support liquid from the circular holes is controlled by a pressure loss at the time of passing through the orifice, to inhibit the wasteful use of the support liquid, and as a result, it becomes possible to lower the energy loss.

CITATION LIST

Patent Document

Patent Document 1: Japanese utility model application laid-open No. H04-109349
Patent Document 2: Japanese patent application laid-open No. H11-173953

SUMMARY OF THE INVENTION

Technical Problems

Incidentally, on the upper face of the belt, the region where a tire is in ground contact varies in position or in area, depending on test loads or test conditions such as fitting alignments of a tire (for example, a condition such as slip angle or camber angle). Accordingly, in the method of the Patent Document 1, it is necessary that the liquid pressure receiving unit of the belt is divided into parts as small as possible so as to be capable of responding to cases that a ground contact region of a tire is changed, and to minutely varying flow rate etc. of the support liquid individually in the divided portions, which makes the test method extremely complicated. Furthermore, in this method of the Patent Document 1, it is also necessary to distinguish a part where a tire is in ground contact from a part where a tire is not in ground contact, which tends to make the device structure of the testing device complicated.

In the method of the Patent Document 2, in order to inhibit the support liquid from blowing out from the circular holes in a region where a tire is not in ground contact, it is necessary to make the diameter of the orifice as small as possible. However, if such an orifice with a small diameter is used, the flow rate of the support liquid blown out from circular holes in a part where a tire is in ground contact is also limited, to make the floating amount of the belt small. Therefore, if a flexible material is used in the belt, the belt will bend and easily cause a problem such that the bent belt contacts a load support device.

The present invention has been accomplished in view of the above described problems, and aims to provide a tire traveling test device which is capable of inhibiting a support liquid from being wastefully blown out from circular holes in a region where a tire is not in ground contact, while being capable of floating a belt up to a sufficient height relative to the upper face of a load support device.

Solution to Problems

In order to achieve the above objects, the present invention takes the following technical measures.

That is, the tire traveling test device of the present invention is characterized in that, in a tire traveling test device comprising a belt horizontally spanned between two drums and a load support device which supports flat face of the belt from the side of lower face, the load support device is provided with a liquid supply means which supplies a support liquid between the load support device and the belt to support the belt from below; the liquid supply means comprising liquid supply holes, capable of discharging the support liquid between the load support device and the belt, in plural numbers along the upper face of the load support device, and flow rate of the support liquid discharged from each of the liquid supply holes being adjustable on the basis of a fluid pressure on the upper face of the load support device which varies according to a ground contact state of the tire.

Incidentally, it is preferred that the liquid supply means is provided along the upper face of the load support device in plural numbers, and comprises a pressure sensor which measures a fluid pressure on the upper face of the load support device.

Incidentally, it is preferred that the liquid supply means comprises a flow rate adjustment valve capable of adjusting a flow rate of the support liquid discharged from each of the liquid supply holes by adjusting a valve opening degree on the basis of a fluid pressure on the upper face of the load support device.

Incidentally it is preferred that the flow rate adjustment valve is configured to have a structure in which a force required in a valve closing becomes small compared to a force required in a valve opening motion.

Incidentally, it is preferred that the liquid supply means is configured to have a structure which adjusts the flow rate of the support liquid discharged from each of the liquid supply holes such that a supplying pressure of the support liquid discharged from each of the liquid supply holes becomes larger than an internal pressure of a tire.

Incidentally, it is preferred that a flow rate adjustment means which adjusts a flow rate of the support liquid discharged from each of the liquid supply holes is provided separately from the load support device, and that the plural liquid supply holes provided on the load support device and the flow rate adjustment means which adjusts the flow rate of the support liquid discharged from the plural liquid supply holes are linked with each other with plural water introduction tubes.

Incidentally, it is preferred that the flow rate adjustment means comprises a sensor provided separately from the load support device, which is capable of measuring a pressure or a flow rate of the support liquid on the upper face of the load support device, and that the flow rate of the support liquid passing through the water introduction tubes are adjusted on the basis of a measured signal of the pressure or the flow rate measured by the sensor.

Incidentally, it is preferred that the flow rate adjustment means comprises a flow rate adjustment valve which is capable of adjusting a flow rate of the support liquid discharged from each of the liquid supply holes by adjusting a valve opening degree on the basis of a pressure or a flow rate of the support liquid circulating through the water introduction tubes.

Effect of the Invention

According to the tire traveling test device of the present invention, it is possible to inhibit the support liquid from being wastefully blown out from the circular holes in a region where a tire is not in ground contact, while the device is capable of floating a tire up to a sufficient height relative to the upper face of the load support device.

BRIEF DESCRIPTION OF DRAWINGS

FIG. 8 is a structural view showing liquid supply units of a fifth embodiment.

DESCRIPTION OF EMBODIMENTS

Hereinbelow, a tire traveling test device 1 according to the present invention will be described in detail on the basis of the drawings.

First Embodiment

Figure 1:
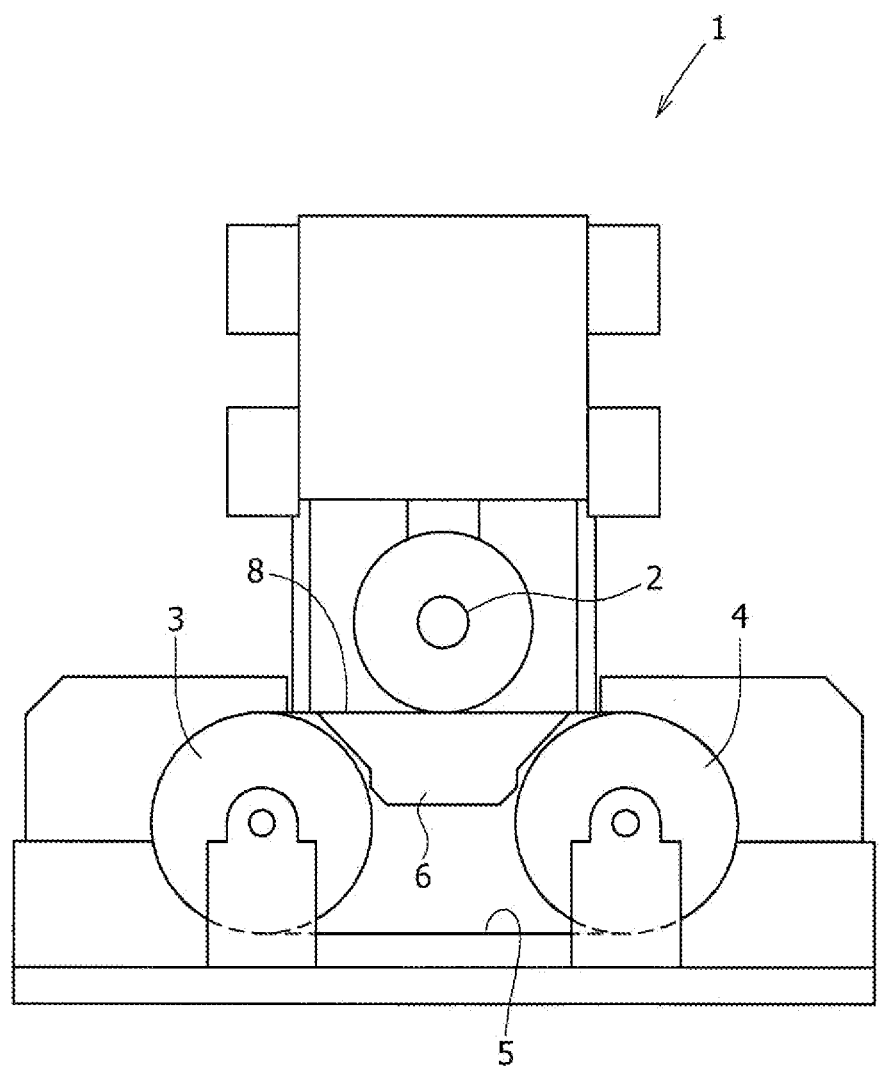
FIG. 1 is a front view of a tire traveling test device of the present invention.

As shown in FIG. 1, the tire traveling test device 1 comprises a spindle axis 2 to mount a tire, a driving drum 3 configured to be rotatable forward and backward, a driven drum 4 provided with being spaced from the driving drum 3 in such a manner that the center axes thereof are parallel with each other, and a traveling belt (hereinafter referred to as belt 5) which is an endless metal plate spanned between the driving drum 3 and the driven drum 4.

Between these driving drum 3 and driven drum 4, the belt 5 is spanned with its upper and lower sections extending in parallel to each other. The upper and lower sections of the belt 5, the upper and lower sections being in parallel to each other, are disposed such that they are both directed in a horizontal direction. By contacting a tire with a flat road surface (a test road surface) formed on the upper face of the upper section of the belt 5, it is possible to evaluate a traveling property of the tire which rolls on a road surface. On the other hand, the back face of the road surface (the lower face of the belt 5 corresponding to the test road surface) is provided with a load support device 6 which supports the belt 5 which bears a tire load.

The load support device 6 is a member the upper face thereof being flat so as to support the belt 5 from below, which is configured to support the belt 5 from below with contacting the upper face with the lower face of the belt 5. The upper face of the tire load support device 6 is provided with a liquid supply means 7 which ejects a pressurized support liquid between the load support device 6 and the belt 5.

Specifically, the load support device 6 is configured such that the upper face thereof constitutes a tire support face 8 which supports a tire, and the belt 5 can be slid along this tire support face 8. In this tire support face 8, a length along a direction perpendicular to the belt running direction (hereinafter, the width direction) is slightly larger than the width of the belt 5, and the belt 5 can be supported throughout the whole area in the width direction thereof. Furthermore, the tire support face 8 is provided with the liquid supply means 7 which ejects a support liquid such as a pressurized water, oil, or the like onto the back face of the belt 5. By using a static pressure of the support liquid supplied from this liquid supply means 7, the load support device 6 floats the belt 5 from the upper face of the load support device 6 (the tire support face 8) so as not to contact the belt 5 with the tire support face 8.

Figure 2:
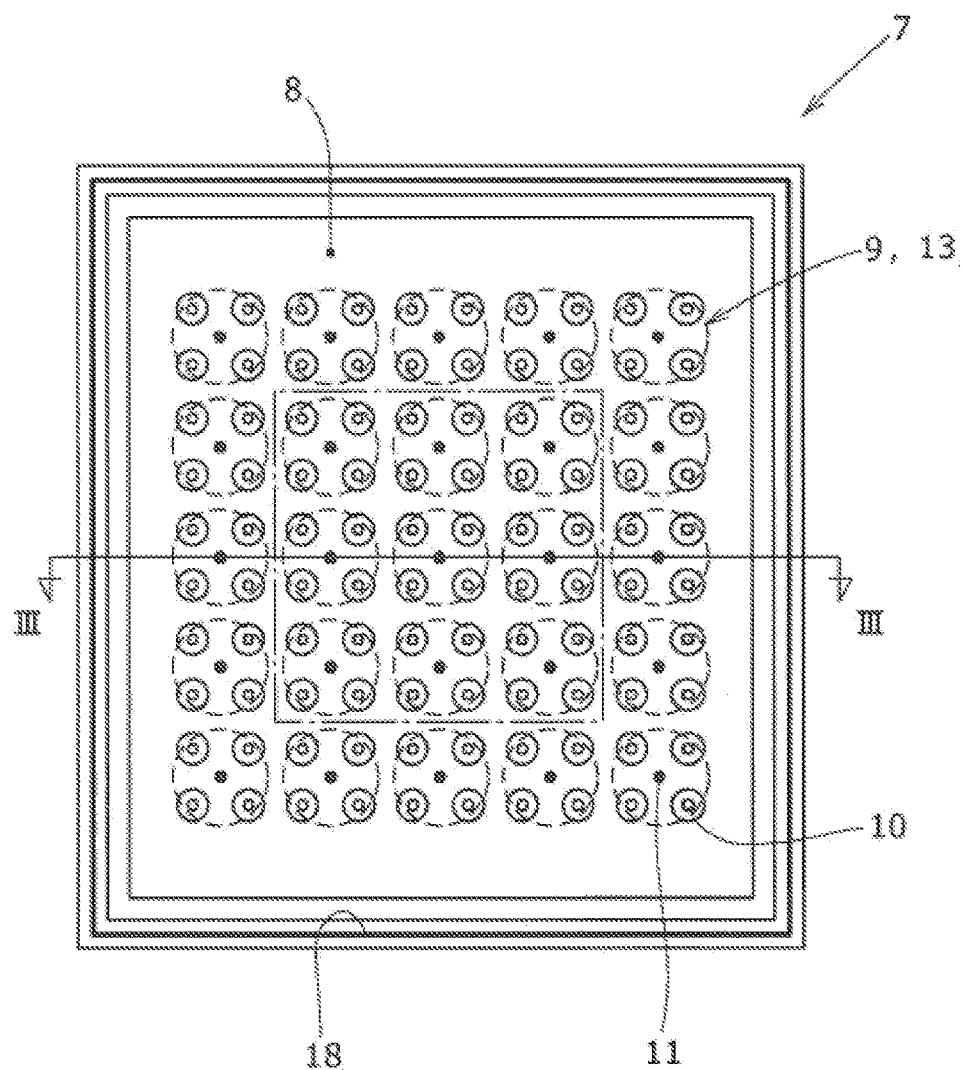
FIG. 2 is a plan view showing an arrangement of circular holes on the upper face of a load support device.
Figure 3:
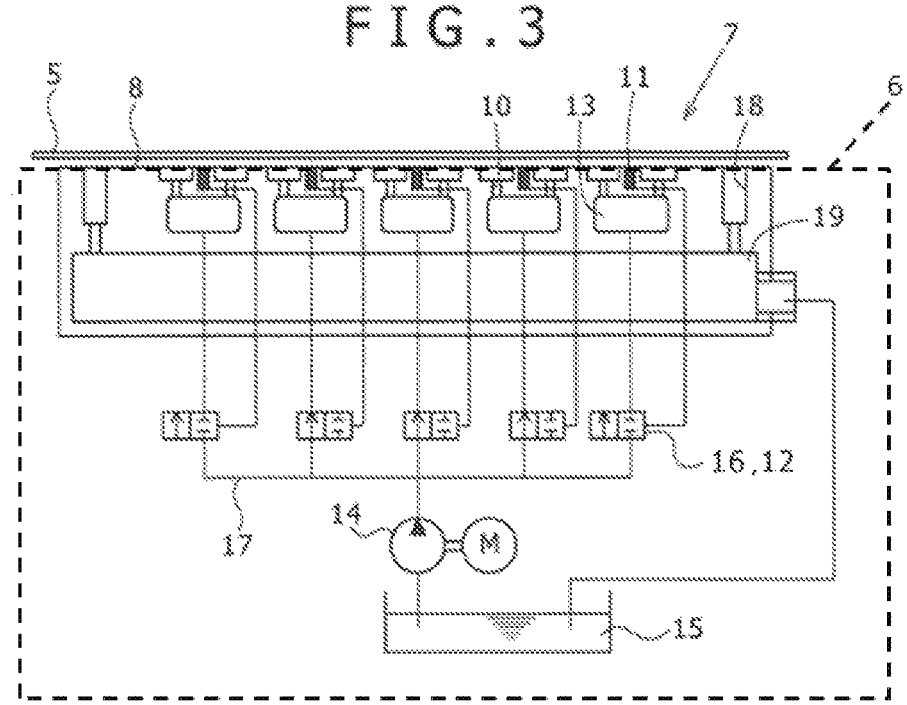
FIG. 3 is a structural view of liquid supply units, including a sectional view of the same taken along the line III-III of FIG. 2.

As shown in FIG. 2 and FIG. 3, the liquid supply means 7 is to supply the support liquid to the tire support face 8 and to float the belt 5 by using a static pressure of the supplied support liquid. The liquid supply means 7 comprises members such as plural liquid supply units 9 provided along the tire support face 8, a storage tank 15 which stores the support liquid, a flow rate adjustment valve 12, a switch valve 16, a support liquid supply tube 17, etc.

Specifically, the plural liquid supply units 9 each comprise a liquid supply hole 10 (a circular hole) which discharges the support liquid and a pressure sensor 11 which measures a pressure of the support liquid (fluid pressure) on the tire support face 8, and are disposed at equal intervals on the tire support face 8, in such a manner to be arranged in rows in the traveling direction of the tire and in the width direction with predetermined spaces.

Each of the above described liquid supply units 9 has the pressure sensor 11 provided in plural numbers at equal intervals along the tire support face 8. One or more liquid supply holes described above are provided so as to correspond to these individual pressure sensors 11, and thus, one liquid supply unit 9 is comprised of these liquid supply holes 10 and the pressure sensor 11. The liquid supply unit 9 also comprises the flow rate adjustment valve 12 which allows an adjustment of a valve opening degree based on a fluid pressure measured by this pressure sensor 11, constituting a structure in which the flow rate adjustment valve 12 adjusts flow rates of the support liquid discharged from the liquid supply hole 10 of each of the liquid supply unit 9.

The liquid supply unit 9 of the present embodiment comprises the pressure sensor 11 disposed in the center, and four liquid supply holes 10 disposed having this pressure sensor 11 as a center in common. Incidentally, number of the liquid supply hole 10 which constitutes the liquid supply unit 9 is not limited to four. For example, it is also possible to use a liquid supply unit 9 provided with each one pressure sensor 11 and liquid supply hole 10, or a liquid supply unit 9 provided with two, three, five, or more liquid supply holes 10 to one pressure sensor 11.

The above described liquid supply hole 10 is a hole formed on the tire support face 8, directed to an up-down direction, forming a structure which blows out the support liquid supplied from below onto the tire support face 8 to thereby float the belt 5 by use of a static pressure of the support liquid blown out. Specifically, the lower end of the liquid supply hole 10 is provided with a support liquid supply chamber 13 which stores the support liquid, constituting a structure in which the support liquid stored in this support liquid supply chamber 13 is distributed and sent to each of the four liquid supply holes 10 at each of the liquid supply units 9.

As shown by broken lines in FIG. 2, the support liquid supply chamber 13 is a cylindrical space formed inside the load support device 6, configured to be capable of storing the support liquid inside. The upper side of this support liquid supply chamber 13 is connected to the above described liquid supply hole 10 in a manner communicated therewith.

The upper side of the liquid supply hole 10 is formed into a cylindrical shape having a diameter larger than that of the lower side which communicates with the support liquid supply chamber 13, so that the support liquid has a larger contact area with the belt 5 and exert a sufficient floating power to the belt 5.

Furthermore, a supplying pressure of the support liquid supplied from the liquid supply hole 10 is controlled to be larger than an internal pressure of a tire, by adjusting a flow rate of the support liquid discharged by using a pump 14 which will be described later, the flow rate adjustment valve 12, or the like. Purpose of making a supplying pressure of the support liquid larger than an internal pressure of a tire in this way is to sufficiently float a tire which has a hardness of a gum in addition to the air pressure.

That is, provided that a hardness of a gum of a tire is zero, a ground contact pressure of the tire coincides with the internal pressure of the tire. However, since an actual tire has a hardness of a gum, a tire has a ground contact pressure larger in value than an internal pressure of the tire in proportion to the gum hardness of the tire.

Meanwhile, a state where the belt 5 floats from the tire support face 8 is a state where a pressure in the gap between the load support device 6 and the belt 5 is approximately equal to a ground contact pressure of the tire. In order to blow out the support liquid into this gap, a pressure at, least larger than the internal pressure of the tire is required as the supplying pressure of the support liquid.

From these reasons, in trying to float the belt 5 from the upper face of the load support device 6, with keeping a tire loaded thereon, the supplying pressure of the support liquid should be made to be a value larger than an internal pressure of the tire.

The pressure sensor 11 (a pressure detection unit) is provided in the center of the liquid supply unit 9 described above, to measure a pressure of the support liquid disposed between the tire support face 8 and the belt 5. In the liquid supply unit 9, flow rates of the support liquid to be supplied from the four liquid supply holes 10 disposed in this liquid supply unit 9 are collectively adjusted on the basis of the pressures measured by the pressure sensor 11.

Concretely, the pressure sensor 11 is attached to the upper face of the load support device 6, and formed with a pressure-sensitive element or the like which measures the pressure of the support liquid. A pressure of the support liquid measured by this pressure sensor 11 is sent as a measured signal to the flow rate adjustment valve 12.

The flow rate adjustment valve 12 adjusts a flow rate of the support liquid supplied from the liquid supply hole 10 disposed in the liquid supply unit 9. This flow rate adjustment valve 12 is provided to the support liquid supply tube 17 which supplies the support liquid to the support liquid supply chamber 13 provided to each of the liquid supply units 9 from the storage tank 15 which will be described later, and comprises the switch valve 16 capable of opening/closing the valve on the basis of the measured signal input from the pressure sensor 11. Concretely, the flow rate adjustment valve 12 has a set value for pressure input in advance, and adjusts a valve opening degree by comparing the set value for pressure with a value measured by the pressure sensor 11.

Used as this set value for pressure is a pressure value by which it is possible to distinguish whether or not a tire is in ground contact. For example, by using a value larger than an atmospheric pressure and not exceeding an internal pressure of a tire as the set value for pressure, it will be possible to distinguish whether or not the tire is in ground contact or not. For example, since the internal pressure of a tire generally is about 2 atmospheres ($203 \times 10^3$ Pa) (gauge pressure) in a passenger car, and more in a truck and bus, it is preferred that the aforementioned set value for pressure is set to about 1 atmosphere ($101 \times 10^3$ Pa) (gauge pressure).

The lower end of the above described support liquid supply tube 17 is provided with the storage tank 15 which stores a used support liquid which was used in a tire traveling test, and the pump 14 which sends the support liquid stored in this storage tank 15 to the flow rate adjustment valve 12 of each of the liquid supply units 9 via the support liquid supply tube 17.

Furthermore, the upper face of the load support device 6 is provided with a water recovering groove 18 which collects the support liquid supplied from the liquid supply holes 10. This water recovering groove 18 is formed in a manner to surround the liquid supply unit 9 from around on the upper face of the load support device 6, so as to be capable of collecting the support liquid blown out from each of the liquid supply holes 10, in the outer side of the liquid supply unit 9.

The lower side of the water recovering groove 18 is provided with a support liquid recycle unit 19 which temporary recycles the support liquid collected by this water recovering groove 18. This support liquid recycle unit 19 is a chamber (a room) which is formed inside the load support device 6 in an isolated state with a water-sealing seal, constituting a structure in which the support liquid collected by the water recovering groove 18 is collectively returned to the above described storage tank 15. That is, the liquid supply means 7 of the present embodiment has a structure in which a recycle use of the support liquid is available in such a manner that the support liquid blown out on the tire support face 8 from the liquid supply holes 10 is collected and returned to the storage tank 15 and reused in the blowing out from the liquid supply holes 10.

In the next place, a method of floating the belt 5 by use of the liquid supply means 7 described above, in other words, the tire traveling test method of the present invention will be described.

For example, provided here is a case where a pressure of a support liquid is measured by the pressure sensor 11 of a liquid supply unit 9, and the measured value of the pressure measured by the pressure sensor 11 is larger than a set value for pressure input in advance.

Here, the set value for pressure is a value larger than an atmospheric pressure and smaller than an internal pressure of a tire, as described above. In other words, this set value for pressure is set to be a value by which it is distinguishable whether or not a measured value of the pressure is larger than an internal pressure of a tire. Thus, when the measured value of the pressure is larger than the set value, it is considered that a pressure larger than an atmospheric pressure is applied between the belt 5 and the tire support face 8, and accordingly, it can be judged that "the tire is in ground contact".

In such cases, the flow rate adjustment valve 12 is switched to "OPEN (ON)". Then, the support liquid in the storage tank 15 is introduced to the support liquid supply chamber 13 through the support liquid supply tube 17 by the pump 14 described above, and further, the support liquid in the support liquid supply chamber 13 is blown out from the tire support face 8 through the liquid supply holes 10 to thereby float the belt 5 with a static pressure of the blown out support liquid.

On the other hand, when the measured value of the pressure measured by the pressure sensor 11 is smaller than a set value for pressure input in advance, in other words, when the pressure generated between the belt 5 and the tire support face 8 is in a degree similar to an atmospheric pressure, it can be judged that "the tire is not in ground contact".

In such cases, the flow rate adjustment valve 12 is switched to "CLOSE (OFF)". Accordingly, the support liquid in the storage tank 15 described above stops being introduced to the support liquid supply chamber 13 through the support liquid supply tube 17, and then, the support liquid in the support liquid supply chamber 13 stops being blown out from the liquid supply holes 10. As a result, the support liquid stops being blown out wastefully from liquid supply holes 10 which are positioned in a region where a tire is not in ground contact, and a wasteful use of the support liquid is suppressed.

By use of the above described liquid supply means 7, the support liquid is blown out from the liquid supply holes 10 in a region where a tire is in ground contact, to allow the belt 5 to float up to a sufficient height relative to the upper face of the load support device 6. On the other hand, in a region where a tire is not in ground contact, the support liquid is stopped being blown out from the liquid supply holes 10, and thus, it becomes possible to suppress a wasteful blowing out of the support liquid to minimize an energy loss.

Second Embodiment

In the next place, a tire traveling test device 1 of a second embodiment will be described with using drawings.

Figure 4:
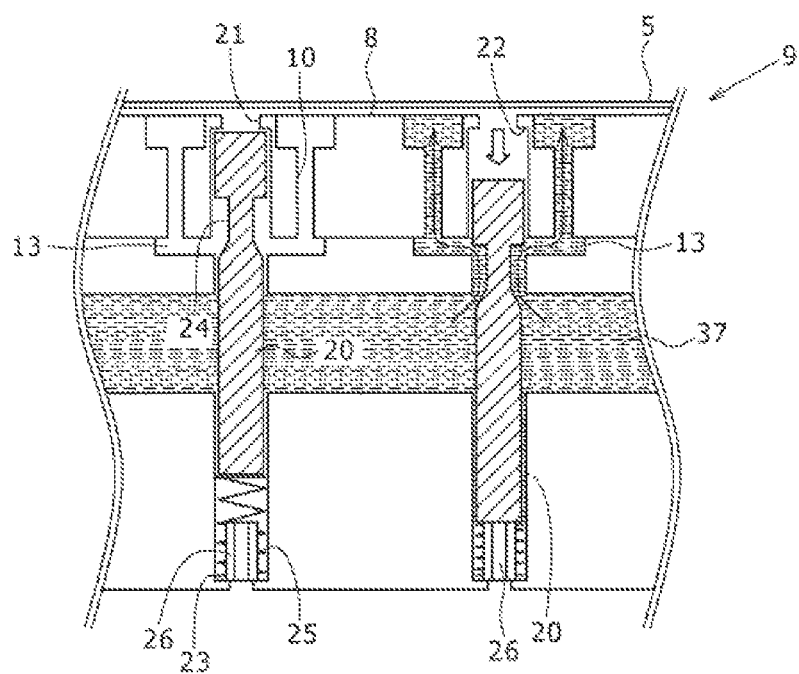
FIG. 4 is a sectional view of flow rate adjustment valves.

As shown in FIG. 4, the tire traveling test device 1 of the second embodiment does not comprise the pressure sensor 11 or the flow rate adjustment valve 12 differently from that of the first embodiment, and is configured to have a structure in which a piston 20 which detects a pressure of the support liquid and performs a valve operation is directly incorporated inside a load support device 6. In other words, the tire traveling test device 1 of the second embodiment is a device which uses a piston-valve having both function of detecting a pressure and function of adjusting a flow rate of the support liquid.

Concretely, the traveling test device 1 of the second embodiment comprises a through hole 21 which penetrates the inside of the load support device 6 in an up-down direction. This through hole 21 penetrates a water supply path 37 formed inside the load support device 6 in the up-down direction from below the water supply path 37, and extends upward from the water supply path 37, and fluffier penetrates a support liquid supply chamber 13 provided above the water supply path 37, and extends further upward from the support liquid supply chamber 13. The upper end of this through hole 21 opens on the upper face of the load support device 6. Inside this through hole 21, the aforementioned piston 20 is accommodated in a manner movable in the up-down direction.

The upper end and the lower end of the through hole 21 are narrowed compared to the middle side in the up-down direction, so that the inner diameter of the through hole 21 is configured to be a smaller diameter than in the middle side. That is, the upper end and the lower end of the through hole 21 are processed to reduce the diameter such that the inner diameter is within a size capable of being engaged with the outer periphery of the piston 20, so as to be capable of controlling up-down movement of the piston 20. Specifically, the upper end of the through hole 21 is configured as an upper side position fixer 22 which controls this upper limit position. The lower end of the through hole 21 is configured as a spring fixing part 23 that fixes a spring 25 which will be described later. The lower end is further provided with a stopper 26 which performs a position fixing in the lower side of the piston.

The piston 20 is a cylindrical member having a diameter (an outer diameter) slightly smaller than the inner diameter of the through hole 21, configured to be movable inside the through hole 21 in the up-down direction. The middle side in the up-down direction of the piston 20 is made as a cut out 24 having a small diameter compared to that in the side of upper end or the side of lower end. That is in the side of upper end or the side of lower end of the piston 20, there is little gap formed between the inner circumferential face of the through hole 21 and the outer circumferential face of the piston 20. However, in the middle side of the piston 20 where the cut out 24 is formed, a gap is formed in the radial direction between the inner circumferential face of the through hole 21 and the outer circumferential face of the piston 20 (the cut out 24), so that the support liquid is allowed to circulate in the up-down direction through this gap. Therefore, if the piston 20 is moved to such a position that the cut out 24 spans over both the water supply path 37 and the support liquid supply chamber 13 by moving the piston 20 in the up-down direction along the through hole 21 described above, it becomes possible to move the support liquid in the water supply path 37 to the support liquid supply chamber 13 by use of the cut out 24.

The upper face of the piston 20 described above is formed into a flat face along the horizontal direction. This upper face of the piston 20 is applied with a pressure of the support liquid which is supplied between the upper face of the load support device 6 and the lower face of the belt 5, such that the piston 20 can be pushed downward.

The lower face of the piston 20 is formed into a flat face along the horizontal direction as the upper face of the piston 20 is. The lower face of the piston 20 is affected by an atmospheric pressure. The spring 25 is disposed on this lower face of the piston 20, and an urging force of this spring 25 is applied to the lower face of the piston 20, such that the piston 20 can be pushed upward. A gap pressure for the piston to operate is adjusted by adjusting this spring force.

In the next place, a method of floating the belt 5 by use of the liquid supply means 7 of the second embodiment described above, in other words, the tire traveling test method of the second embodiment will be described.

For example, provided here is a case where a pressure larger than the above described set value for pressure affects the upper face of the above described piston 20, in other words, a case where "a tire is in ground contact".

In such cases, a pressure in the gap between the belt 5 and the tire support face 8 is increased due to the ground contact of the tire, and a pressure applied to the upper face of the piston 20 from above is also increased. When this force applied to piston 20 exceeds the urging force of the spring 25 described above, the piston 20 moves downward until it touches the stopper 26, and the liquid supply means 7 is switched to "OPEN (ON)".

Then, as shown in the right side of FIG. 4, the piston 20 moves to the lower end of the through hole 21. When the piston 20 comes to slightly above the spring fixing part 23, the water supply path 37 and the support liquid supply chamber 13 are brought into a communicating state through the cut out 24, and the support liquid in the water supply path 37 is sent to the support liquid supply chamber 13 through the cut out 24. As a result, the support liquid in the support liquid supply chamber 13 is blown out from the liquid supply hole 10, and the belt 5 is floated with a static pressure of the blown out support liquid.

Next, provided here is a case where a pressure smaller than the above described set value for pressure affects the upper end of the above described piston 20, in other words, a case where "a tire is not in ground contact" or a case where "a ground contact pressure from a tire is decreased" due to a change in tire alignment or a decrease in load.

When the pressure applied from a tire is decreased in this way, the pressure in the gap between the belt 5 and the tire support face 8 is decreased, and the power applied from above to the upper face of the piston 20 is also decreased. Then, the urging force of the spring 25 described above exceeds the force applied from above to the piston 20, then, the piston 20 is moved upward with the urging force of the spring 25, and the liquid supply means 7 is switched from "OPEN (ON)" to "CLOSE (OFF)".

Accordingly, as shown in the left side of FIG. 4, the piston 20 moves to the upper end of the through hole 21, and when the piston 20 comes to the position of the position fixer 22 in the upper side, the water supply path 37 and the support liquid supply chamber 13 are brought into non-communicating state, and the support liquid in the water supply path 37 stops being blown out from the liquid supply hole 10.

Figure 5:
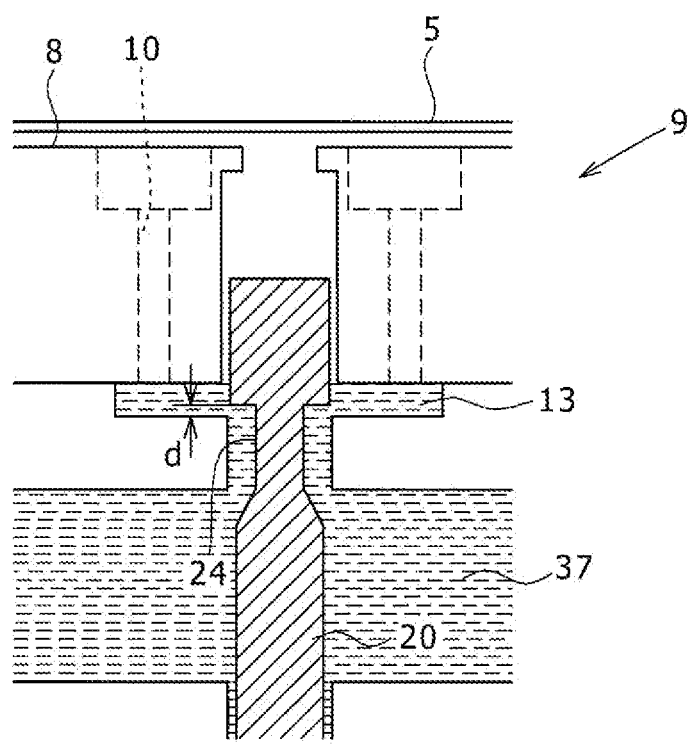
FIG. 5 is an enlarged view of a liquid supply unit of a second embodiment.

When a ground contact pressure of a tire is reduced under a condition that the piston 20 is in OPEN state, in some cases, a flow rate of the water which flows through the cut out 24 is rapidly increased before the piston 20 moves upward to brought into the CLOSE state, and the piston 20 does not move upward due to the force of the water and the piston 20 is not brought into the CLOSE state. This is because the fluid from the water supply path 37 which passes through the cut out 24 generates a fluid force which presses the piston 20 downward. On the other hand, as shown in FIG. 5, if a gap d in the upper end of the cut out 24 (a gap d formed between the upper end of the cut out 24 and the support liquid supply chamber 13) is made smaller, a dynamic pressure of the fluid is converted into a static pressure, and a fluid force which moves the piston upward is generated. That is, adjusting the gap d by varying the level of the stopper 26 which is shown in FIG. 4 increases certainty of closing operation of the piston 20, and it becomes possible to optionally adjust the force required in the valve closing operation.

As a result, it becomes possible that the support liquid is blown out from the liquid supply hole 10 in a region where a tire is in ground contact, to float the belt 5 up to a sufficient height relative to the upper face of the load support device 6. On the other hand, in a region where a tire is not in ground contact, the support liquid is stopped being blown out from the liquid supply hole 10, and thus, it becomes possible to suppress a wasteful blowing out of the support liquid to minimize an energy loss.

Third Embodiment

In the next place, a tire traveling test device 1 of a third embodiment will be described with using drawings.

Figure 6:
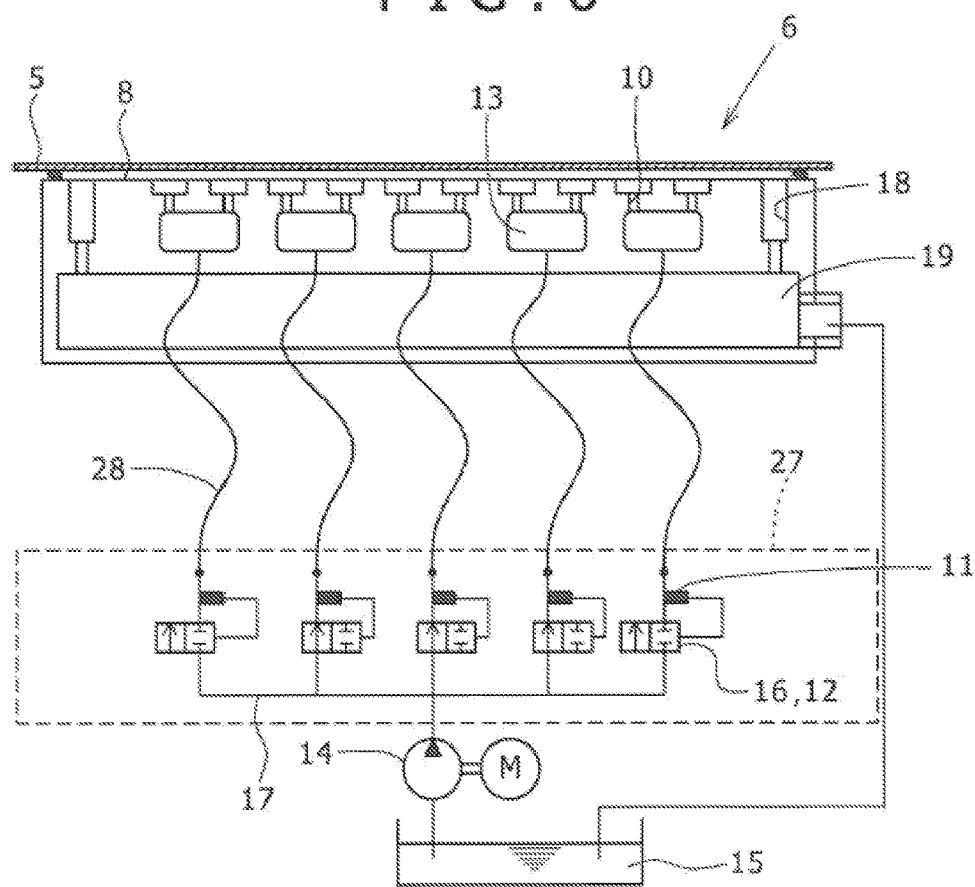
FIG. 6 is a structural view showing liquid supply units of a third embodiment.

As shown in FIG. 6, the tire traveling test device 1 of the third embodiment performs opening/closing of a valve by switching a switch valve 16 (flow rate adjustment valve 12) on the basis of a measured signal input from a pressure sensor 11, similarly as in the first embodiment. This tire traveling test device 1 of the third embodiment differs from that of the first embodiment in a point that a flow rate adjustment means 27 which adjusts a flow rate of the support liquid discharged from the plural liquid supply holes 10 is provided separately from a load support device 6 with being spaced from the load support device 6.

For example, in the first embodiment shown in FIG. 3, the support liquid supply chamber 13 or the support liquid recycle unit 19 was disposed immediately below the upper face (the tire support face 8) of the above described load support device 6 which support the belt 5, and the members such as the switch valve 16, the pump 14, or the storage tank 15 (the flow rate adjustment means 27) were disposed further below the support liquid supply chamber 13 or the support liquid recycle unit 19. That is, the flow rate adjustment means 27 of the first embodiment described above had a structure in which the flow rate adjustment means 27 is present inside the load support device 6.

On the other hand, in the tire traveling test device 1 of the third embodiment, the switch valve 16, a pump 14, and a storage tank 15 which constitute the flow rate adjustment means 27 are provided in a separate position spaced from the load support device 6. That is, the load support device 6 and the flow rate adjustment means 27 are disposed separately from each other and these members are connected with each other via a water introduction tube 28.

If it is possible to provide the flow rate adjustment means 27 and the load support device 6 in separate positions in this way, it becomes possible to install the flow rate adjustment means 27 in a position separate from the load support device 6 with a sufficient space, even in a case where a sufficient space cannot be provided inside the load support device 6, particularly below the belt 5, and thus, it becomes possible not to restricted by installation space.

Specifically, although the surface of the tire support face 8 of the third embodiment is provided with the liquid supply holes 10, the surface of this tire support face 8 is not provided with such a pressure sensor 11 as provided in the first embodiment. Such pressure sensor 11 is provided in the tip of the water introduction tube 28 which is disposed on the support liquid supply chamber 13 linked to the lower ends of the liquid supply holes 10 (the water introduction tube 28 in the side nearest to the flow rate adjustment means 27).

This water introduction tube 28 is formed, for example, with a tube material bendable freely as a flexible tube, and is capable of linking between the flow rate adjustment means 27 and the load support device 6 disposed at a distance, in various route. Use of such freely bendable water introduction tube 28 allows the flow rate adjustment means 27 to be provided without influence of a layout, in a factory or the like where the device is installed, and thus, it becomes possible to improve convenience of the tire traveling test device 1.

As described above, the water introduction tube 28 is provided with the pressure sensor 11, in the end part in the side of the flow rate adjustment means 27. The pressure sensor 11 is configured to be capable of measuring a pressure of the tire support face 8, at the end part of the water introduction tube 28, positioned in the side opposite to the liquid supply hole 10. The pressure sensor 11 is disposed in each of the plural water introduction tubes 28, and is capable of measuring pressure in each of the water introduction tubes 28. A pressure of the support liquid measured by this pressure sensor 11 is sent as a measured signal to the switch valve 16 (the flow rate adjustment valve 12) as a "pressure on the tire support face 8".

The switch valve 16 is configured to open/close the circulation of the support liquid in each of the water introduction tubes 28 described above, such that the "pressure on the tire support face 8" measured by the pressure sensor 11 becomes equal to or higher than, the predetermined set value for pressure, similarly as in the first embodiment.

That is, when the "pressure on the tire support face 8" measured by the pressure sensor 11 is equal to or higher than the predetermined set value for pressure, it is judged that "the tire is in ground contact". Then, the switch valve 16 (the flow rate adjustment valve 12) is switched to "OPEN (ON)". Accordingly, the support liquid in the storage tank 15 is introduced to, the support liquid supply chamber 13 through a support liquid supply tube 17 and the water introduction tubes 28 by the pump 14 described above, and then, the support liquid in the support liquid supply chamber 13 is blown out from the tire support face 8 through the liquid supply holes 10, to thereby float the belt 5 with a static pressure of the support liquid blown out between the belt 5 and the load support device 6 which are water-tightly isolated by a water-sealing seal.

On the other hand, when a measured value measured by the pressure sensor 11 is smaller than a set value for pressure input in advance, it is judged that "the tire is not in ground contact". Then, the flow rate adjustment valve 12 is switched to "CLOSE (OFF)". Accordingly, the support liquid in the storage tank 15 described above is stopped being introduced to the support liquid supply chamber 13 through the support liquid supply tube 17 and the water introduction tubes 28, and the support liquid in the support liquid supply chamber 13 stops being blown out from the liquid supply holes 10. As a result, the support liquid stops being blown out wastefully from the liquid supply holes 10 which are positioned in a region where a tire is not in ground contact, and a wasteful use of the support liquid is suppressed.

It is possible, also according to the tire traveling test device 1 of the third embodiment described above, to float a tire up to a sufficient height relative to the upper face of the load, support device 6, and it becomes possible to inhibit the support liquid from being wastefully blown out from the circular holes in the region where a tire is not in ground contact.

Additionally, according to the traveling test device 1 of the third embodiment, since the flow rate adjustment means 27 provided separately from the load support device 6 has an extremely simple structure, it becomes easy to check the valve operation status in the flow rate adjustment means 27. For example, the valve operation will be further easily checked, by making a part of the flow rate adjustment means 27 with glass or acrylic glass to visualize the inside, or by providing each of the water introduction tubes with a flow rate meter, and thus, it is also possible to contribute to an improvement in maintainability.

The load support device 6 has a complex structure comprising orifices, etc., and is difficult to be disassembled in many cases. By providing the flow rate adjustment means 27 separately from such load support device 6, it becomes possible to individually replace or maintenance the switch valve 16 provided in plural numbers in the flow rate adjustment means 27, without disassembling the load support device 6, and thus, it becomes possible to significantly improve a maintainability of the traveling test device 1.

Furthermore, according to the traveling test device 1 of the third embodiment, it is not necessary to coincide a position of the switch valve 16 of the flow rate adjustment means 27 with a position of the liquid supply hole 10 of the load support device 6 in the horizontal direction, and therefore, it becomes possible to adopt a free layout which is easy in maintenance or designing to the flow rate adjustment means 27.

The structures and the functions/effects other than those described above of the third embodiment are the same as in the first embodiment. Therefore, explanation for such parts which are the same as in the embodiment will be omitted.

Fourth Embodiment

It is possible to adopt the structure in which the flow rate adjustment means 27 and the load support device 6 are provided separately as in the third embodiment described above also to a flow rate adjustment means 27 which does not use the switch valve 16 as shown in a four embodiment.

In the next place, a tire traveling test device 1 of the fourth embodiment will be described with using drawings.

Figure 7A:
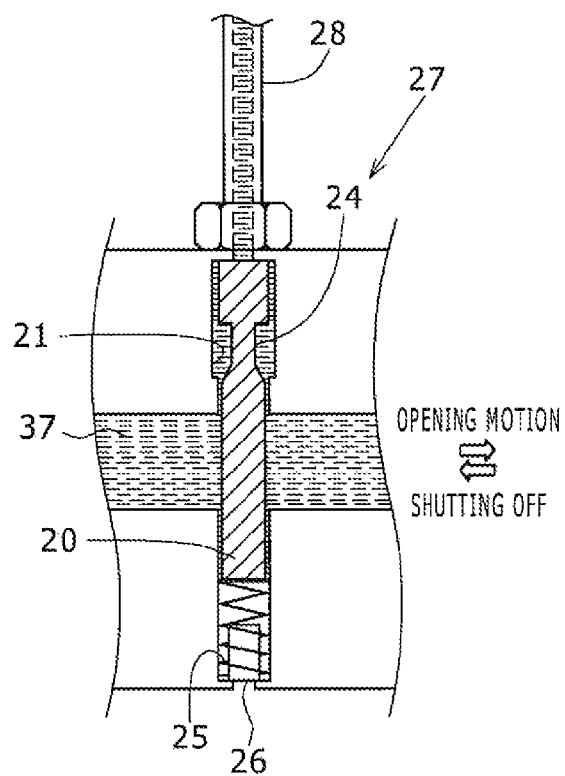
FIG. 7A is a partially enlarged view showing a structure and a movement of a liquid supply unit of a fourth embodiment.
Figure 7B:
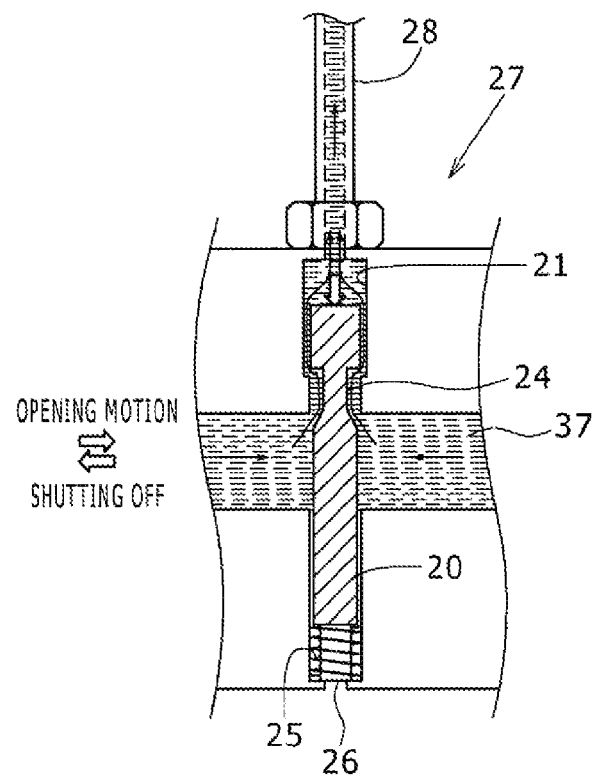
FIG. 7B is a partially enlarged view showing a structure and a movement of the liquid supply unit of the fourth embodiment.

As shown in FIG. 7A and FIG. 7B, the tire traveling test device 1 of the fourth embodiment is also configured to use a piston 20 (a piston valve which is operated passively) which moves in the up-down direction inside a through hole 21, similarly as in the second embodiment. The tire traveling test device 1 of the fourth embodiment differs from that of the second embodiment in a point that a load support device 6 and a flow rate adjustment means 27 are, separately provided and the two members are connected with each other via a water introduction tube 28, similarly as in the third embodiment.

Specifically, the flow rate adjustment means 27 of the fourth embodiment comprises the piston 20 in a movable manner in the up-down direction inside the through hole 21 which is formed along the up-down direction, as in the second embodiment. This piston 20 also functions as a piston valve. The lower end of this piston 20 is provided with a spring 25 which urges the piston 20 to be pushed upward along the direction in which the through hole 21 is formed. The upper end of the through hole 21 opens upward, and the above described water introduction tub 28 is linked to this opening of the through hole 21.

The piston 20 of the fourth embodiment also is provided with, a cut out 24 having a small outer diameter compared to the side of upper end or the side of lower end, in middle side of the up-down direction. That is, although there is little gap formed between the inner circumferential face of the through hole 21 and the outer circumferential face of the piston 20 in the side of upper end or the side of lower end of the piston 20, a gap is formed in the radial direction between the inner circumferential face of the through hole 21 and the outer circumferential face of the piston 20 (cut out 24) in the middle side of the piston 20 where the cut out 24 is formed, and through this gap, the support liquid is allowed to circulate in the up-down direction. Therefore, if the piston 20 is moved to such a position that a water supply path 37 and the upper part of the through hole 21 communicate with each other through the cut out 24 by moving the piston 20 in the up-down direction along the above described through hole 21, it is possible to move the support liquid in the water supply path 37 to the water introduction tube 28 by using the cut out 24.

That is, on the upper face of the piston 20 formed into a flat face along the horizontal direction, a pressure of the tire support face 8 is transmitted via the water introduction tube 28. When this force applied to the upper face of the piston 20 exceeds the urging force of the spring 25, the piston 20 moves downward inside the through hole 21. Then, a gap is formed in the radial direction between the outer circumferential face of the piston 20 (cut out 24) which has moved to the side of lower end of the through hole 21 and the through hole 21 to thereby allow the support liquid to circulate upward. As a result, it becomes possible to float a tire up to a sufficient height relative to the upper face of the load support device 6.

On the other hand, when the force applied to the upper face of the piston 20 lowers the urging force of the spring 25, the piston 20 moves upward inside the through hole 21. Then, the gap between the piston 20 and the through hole 21 is lost, to thereby inhibit the support liquid from circulating upward inside the through hole 21. As a result, the support liquid stops being blown out wastefully from a liquid supply hole 10 which is positioned in a region where, for example, a tire is not in ground contact, and a wasteful use of the support liquid is suppressed.

Thus, it is possible, also according to the tire traveling test device 1 of the fourth embodiment, to obtain an effect of inhibiting the support liquid from being wastefully blown out from a liquid supply hole 10 (circular hole) in a region where a tire is not in ground contact, while the device is capable of floating a tire up to a sufficient height relative to the upper face of the load support device 6.

In this connection, the structures and the functions/effects other than those described above of the fourth embodiment are the same as in the second embodiment. Therefore, explanation for such parts which are the same as in the embodiment will be omitted.

Fifth Embodiment

In the next place, a tire traveling test device 1 of a fifth embodiment will be described with using drawings.

In the third and fourth embodiments described above, a pressure of the support liquid on the tire support face 8 was introduced to the pressure sensor 11 or the piston 20 of the flow rate adjustment means 27 through the water introduction tube 28. However, this water introduction tube 28 is to circulate the support liquid in the side of the tire support face 8 as needed, and due to the support liquid flowing at a predetermined flow velocity, considerable pressure loss occurs in the water introduction tube 28.

Occurrence of such pressure loss tends to lower an accuracy of a pressure measured by the pressure sensor 11, or to cause a malfunction in the operation of the switch valve 16 or the piston 20. Accordingly, in the tire traveling test devices 1 of the fifth and a sixth embodiments, the pressure of the support liquid on the tire support face 8 is introduced to a flow rate adjustment means 27 not by a water introduction tube 28 but by a pressure introduction tube 29.

Concretely, as shown in FIG. 8, in the tire traveling test device 1 of the fifth embodiment, a pressure detection hole 31 which detects a pressure of the support liquid on the tire support face 8 is formed on the surface of the tire support face 8. Then, the aforementioned pressure introduction tube 29 is configured to have a structure with a side of one end opened to this pressure detection hole 31, and a side of the other end opened to the side of the pressure sensor 11 of the flow rate adjustment means 27. In this pressure introduction tube 29, the support liquid does not circulate as in the above described water introduction tube 28, and therefore, it is possible that a pressure on the tire support face 8 (the pressure detection hole 31) of the load support device 6 is transmitted to the pressure sensor 11 of the flow rate adjustment means 27 provided separately from this load support device 6, without generating the pressure loss. Thus, it becomes possible to accurately adjust a flow rate of the support liquid blown out from the liquid supply hole 10 at the flow rate adjustment means 27, even in a case where there is a distance between the flow rate adjustment means 27 and the load support device 6, and thus, it becomes possible to obtain the tire traveling test device 1 excellent in convenience, without restriction of environment where it is used.

In this connection, the structures and the functions/effects other than those described above of the fifth embodiment are the same as in the first and the third embodiments. Therefore, explanation for such parts which are the same as in the embodiments will be omitted.

Sixth Embodiment

In the next place, a tire traveling test device 1 of the sixth embodiment will be described with using drawings.

Figure 9A:
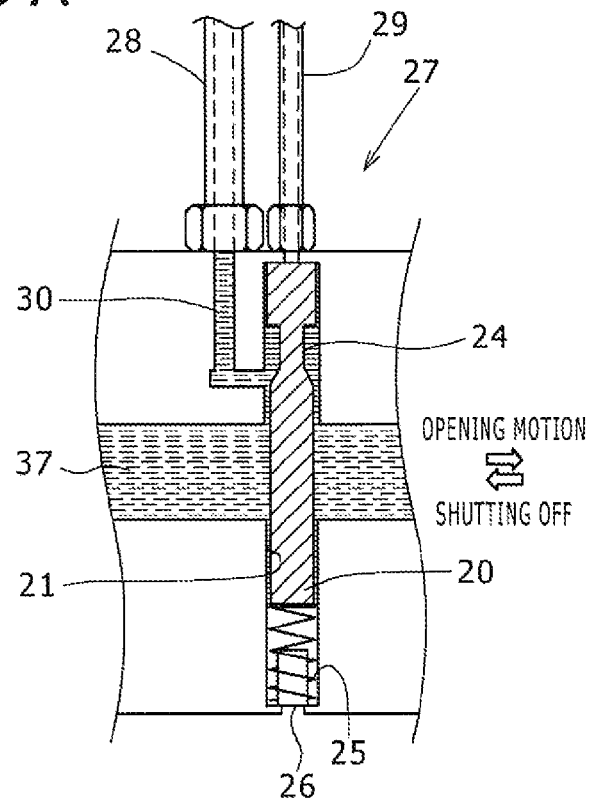
FIG. 9A is a partially enlarged view showing a structure and a movement of a liquid supply unit of a sixth embodiment.
Figure 9B:
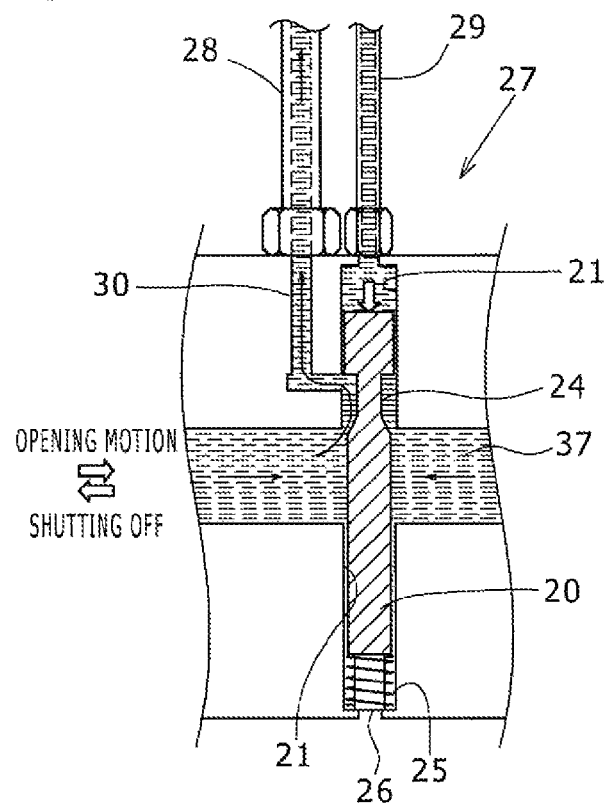
FIG. 9B is a partially enlarged view showing a structure and a movement of the liquid supply unit of the sixth embodiment.

As shown in FIG. 9A and FIG. 9B, also in the tire traveling test device 1 of the sixth embodiment, the pressure of the support liquid on the tire support face 8 is introduced to the flow rate adjustment means 27 not by the water introduction tube 28 but by the pressure introduction tube 29, similarly as in the fifth embodiment.

Concretely, in the tire traveling test device 1 of the sixth embodiment, a branch tube 30 which extends along the upward direction as a through hole 21 is formed inside the flow rate adjustment means 27. This branch tube 30 is formed in a side of the through hole 21, and the lower end of the branch tube 30 is connected to the middle side in the up-down direction of the through hole 21. To the upper end of this branch tube 30, the lower end of the water introduction tube 28 is linked. Meanwhile, the upper end of the pressure introduction tube 29 is connected to the pressure detection hole 31 described above. Further, an upper end of the through hole 21 opens upward, and to this opening of the through hole 21, the aforementioned pressure introduction tube 29 is linked.

By providing the branch tube 30 and the pressure introduction tube 29 described above, it is possible that a pressure on the tire support face 8 of the load support device 6 is transmitted to a piston 20 of the flow rate adjustment means 27 provided separately from this load support device 6, without generating the pressure loss, and it becomes possible to accurately adjust a flow rate of the support liquid blown out from the liquid supply hole 10 at the flow rate adjustment means 27, similarly as in the fifth embodiment.

In addition, since the traveling test device 1 of the sixth embodiment has a structure in which a pressure on the tire support face 8 directly effects the piston 20 without the pressure loss, the opening/closing operation (up-down motion) of the piston 20 is stabilized, and it becomes possible to surely perform the flow rate adjustment of the support liquid by the flow rate adjustment means 27.

In this connection, the structures and the functions/effects other than those described above of the sixth embodiment are the same as in the second and the fourth embodiments. Therefore, explanation for such parts which are the same as in the embodiments will be omitted.

Seventh Embodiment

In the next place, a tire traveling test device 1 of a seventh embodiment will be described with using drawings.

As described in the second embodiment, when the ground contact pressure of a tire is rapidly reduced under a condition that the piston 20 is in the OPEN state, in some cases, a flow rate of water which flows through the cut out 24 is rapidly increased before the piston 20 moves upward to brought into the CLOSE state, and the piston 20 is not brought into the CLOSE state due to the force of the water, and is left in a "kept opened state".

To avoid such "kept opened state" of the piston 20, the second embodiment described above was provided with a mechanism to assist the closing of the piston 20, in which the lower side of the piston 20 is provided with the spring 25 which urges the piston 20 upward such that the force required in closing valve becomes small compared to the force required in valve opening motion.

However, in such a case that the "kept opened state" of the piston 20 cannot be surely avoided only by providing the spring 25 shown in the second embodiment, etc., it is possible to use a flow rate adjustment means 27 as shown in the present embodiment (the seventh embodiment).

That is, as shown in FIG. 10 to FIG. 13, in the flow rate adjustment means 27 of the seventh embodiment, the outside of piston 20 is provided with a valve member 32 which moves in the up-down direction with being caught in the outer circumferential face of this piston 20. That is, the flow rate adjustment means 27 of the seventh embodiment is provided with the valve member 32 which avoids the "kept opened, state" of the piston 20, addition to the piston 20 which adjust the flow rate of the support liquid.

Concretely, this valve member 32 is a cylindrical member engageable with the upper side of the piston 20 from a cut out 24 with a play outside, and is inserted inside a through hole 21 in a manner movable in the up-down direction. This valve member 32 comprises an inside-outside circulation opening 33 which penetrates the outer circumferential wall through the inside and outside thereof along the radial direction.

The inside-outside circulation openings 33 are formed on the circumferential wall of the valve member 32 over plural points (for example, three points or four points) with substantially equal spaces in the circumferential direction, and configured to be capable of introducing the support liquid in the outside of the valve member 32 into the inside through the circumferential wall.

The upper side of the valve member 32 is provided with a second spring 34 which urges this valve member 32 downward. The upper end of this second spring 34 is attached to a support piece 35 formed inside the through hole 21 in a fixed manner. This support piece 35 provided inside the through hole 21 is fixed in the center side of the through hole 21 with a support member or the like which is not illustrated. The lower end of the second spring 34 is attached to the valve member 32 such that the second spring 34 is capable of urging the valve member 32 downward relative to the support piece 35.

The through hole 21 provided to the flow rate adjustment means 27 of the seventh embodiment is configured to have a cylindrical shape such that the inner diameter is larger in the upper side than in the lower side, and the cylindrical part in the upper side with this larger inner diameter is capable of being inserted with the valve member 32 inside. Furthermore, on the inner circumferential face of the through hole 21, a support liquid guide member 36 which guides the support liquid in the support liquid supply chamber 13 along the up-down direction is formed, and thus, the support liquid is allowed to be circulated in the up-down direction with the support liquid guide member 36 even in a state that the valve member 32 is inserted inside. This support liquid guide member 36 is formed on positions corresponding to the positions in the circumferential direction on which the inside-outside circulation openings 33 are formed, and configured to be capable of guiding the support liquid of the support liquid supply chamber 13 upward and then introducing it into the inside-outside circulation opening 33.

In the flow rate adjustment means 27 of the seventh embodiment described above, the "kept opened state" of the piston 20 is controlled by the valve member 32 operated as shown below.

Figure 10:
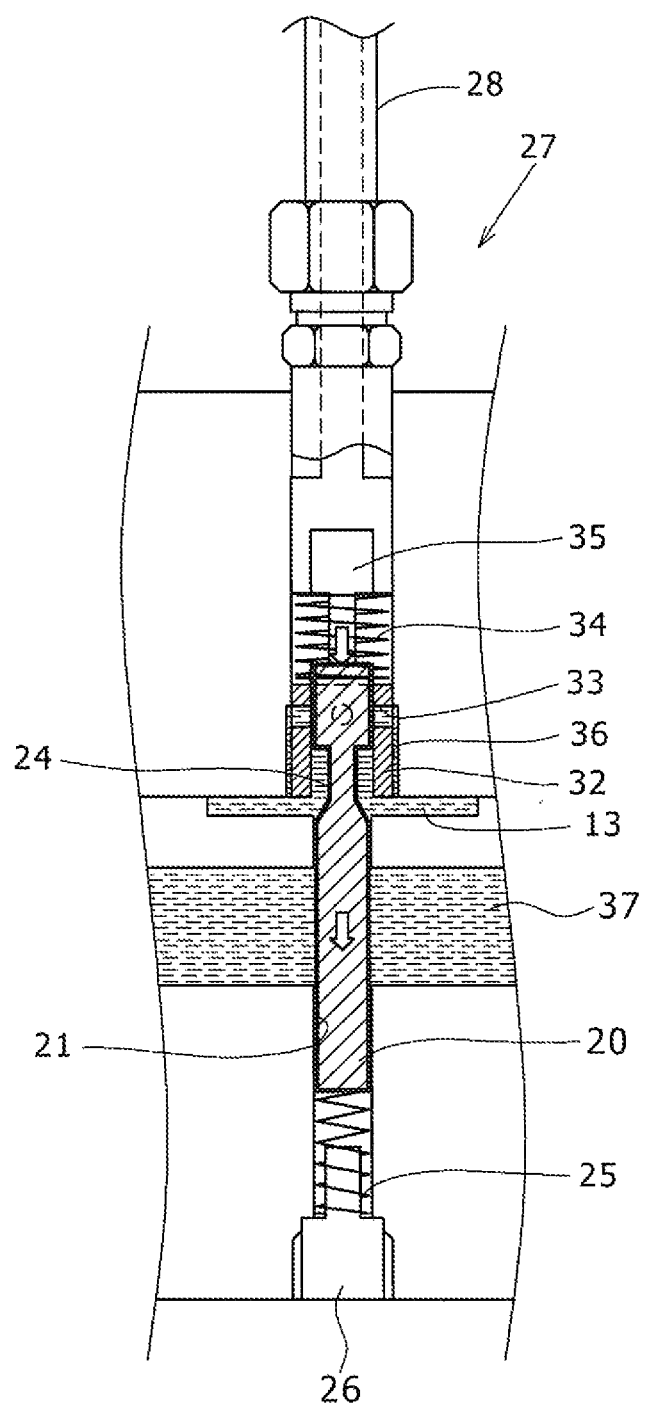
FIG. 10 is a partially enlarged view showing a structure and a movement of a liquid supply unit of a seventh embodiment.

For example, as shown in FIG. 10, provided here is a case where a pressure of the support liquid on the tire support face 8 via the water introduction tube 28 has become high and the piston 20 is in the OPEN state. In this case, the pressure of the support liquid affecting the upper face of the piston 20 is exceeding a predetermined pressure, and accordingly, the piston 20 moves downward against the force of the spring 25.

Figure 11:
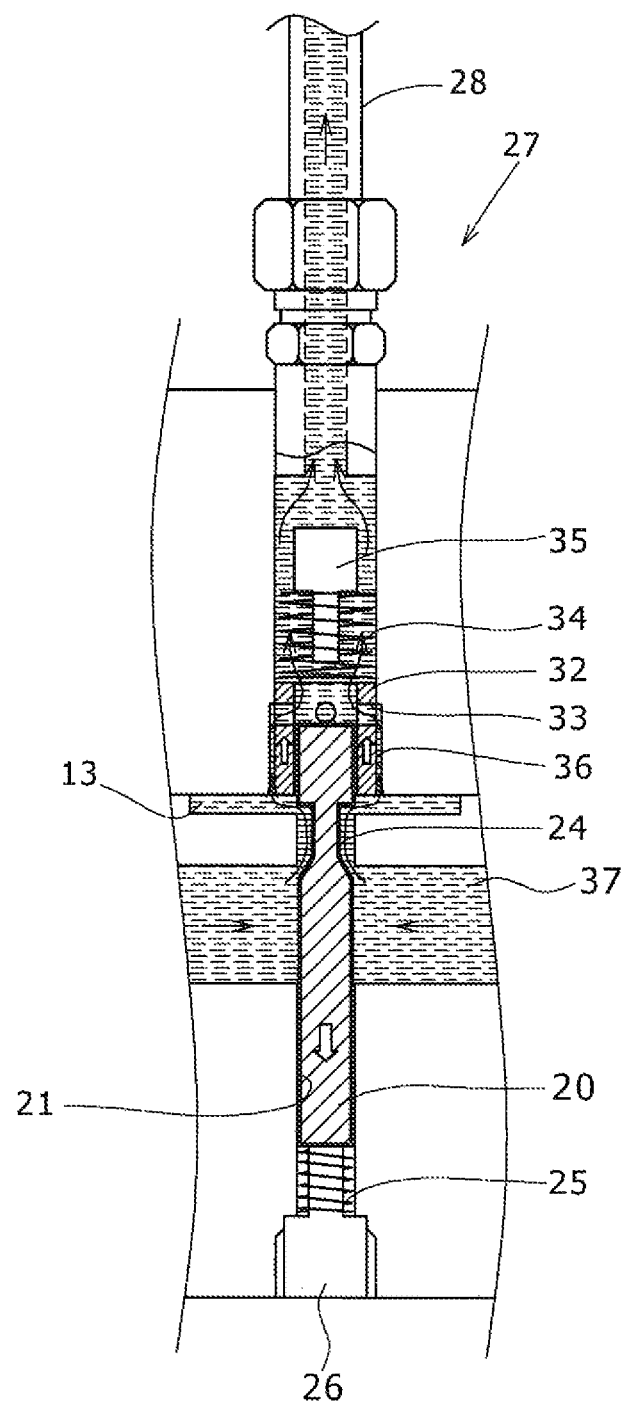
FIG. 11 is a partially enlarged view showing a structure and a movement of the liquid supply unit of the seventh embodiment.
Figure 12:
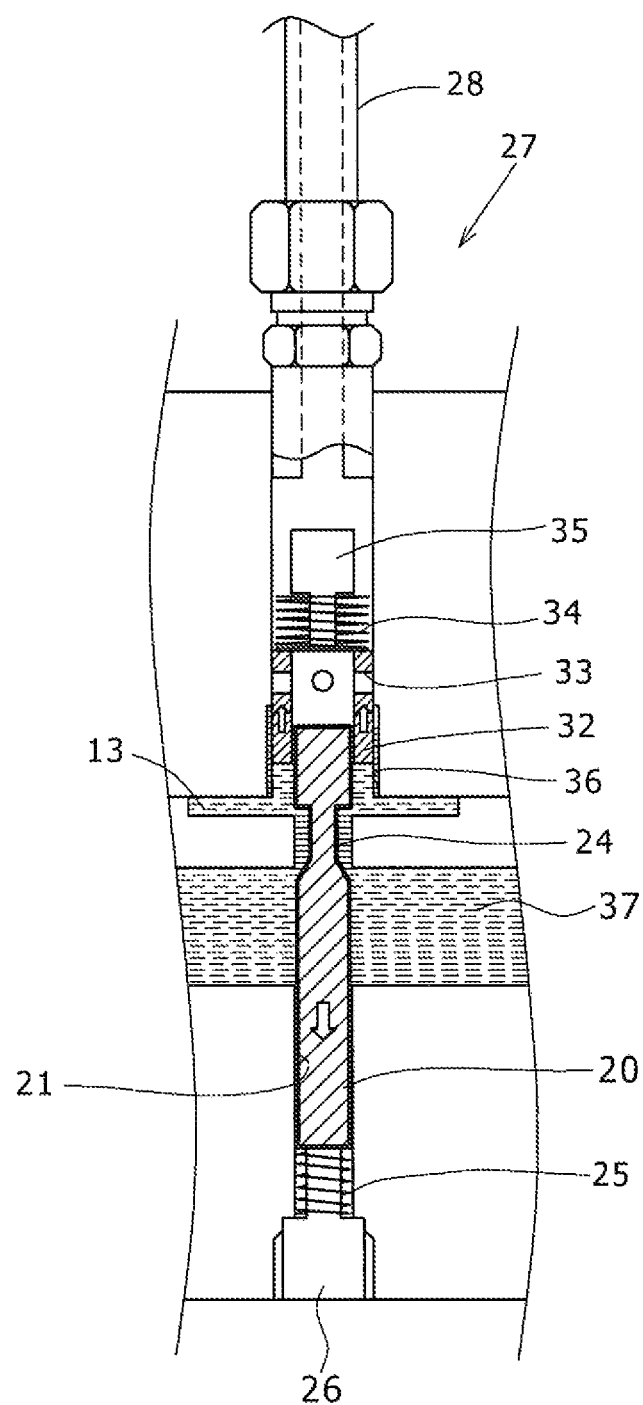
FIG. 12 is a partially enlarged view showing a structure and a movement of the liquid supply unit of the seventh embodiment.

As shown in FIG. 11, as the piston 20 moves downward, a gap is formed in the radial direction, between the inner circumferential face of the through hole 21 and the cut out 24, and through this gap, the support liquid of the water supply path 37 flows into the support liquid supply chamber 13. The support liquid which has flowed into the support liquid supply chamber 13 in this manner moves through the plural support liquid guide members 36 and through the inside-outside circulation openings 33 described above, further to the inside of the through hole 21 above the piston 20. Then, the support liquid inside the through hole 21 above the piston 20 is supplied to the tire support face 8 through the water introduction tube 28, to increase the pressure of the support liquid on the tire support face 8 to thereby allow a tire to be floated up to a sufficient height.

In this connection, the support liquid guide member 36 described above is a narrow path (a path difficult to pass through for being narrow) compared to the gap of the cut out 24 or the inside-outside circulation opening 33, which is formed to be the narrowest among the paths through which the support liquid circulates. Therefore, when the support liquid is introduced to such a narrow path, a large pressure loss is generated, and due to the generated pressure loss, a force is applied to the valve member 32 upward.

If the force is applied to the valve member 32 upward in this manner, the valve member 32 moves upward against the urging force of the second spring 34. When the valve member 32 moves upward up to the position shown in FIG. 12, the position of the opening of the support liquid guide member 36 and the position of the opening of the inside-outside circulation opening 33 is shifted in the up-down direction to thereby shut off the communication between the support liquid guide member 36 and the inside-outside circulation opening 33 and the supply of the support liquid is stopped.

As for a case in which the force of the support liquid which circulates through the support liquid guide member 36 is small, the pressure loss will not become large either, and accordingly, the supply of the support liquid will not be shut off by the valve member 32. That is, this valve member 32 is configured to have a structure which controls the "kept opened status" of the piston 20 by shutting the supply of the support liquid only when the force of the support liquid circulating through the support liquid guide member 36 is large.

Figure 13:
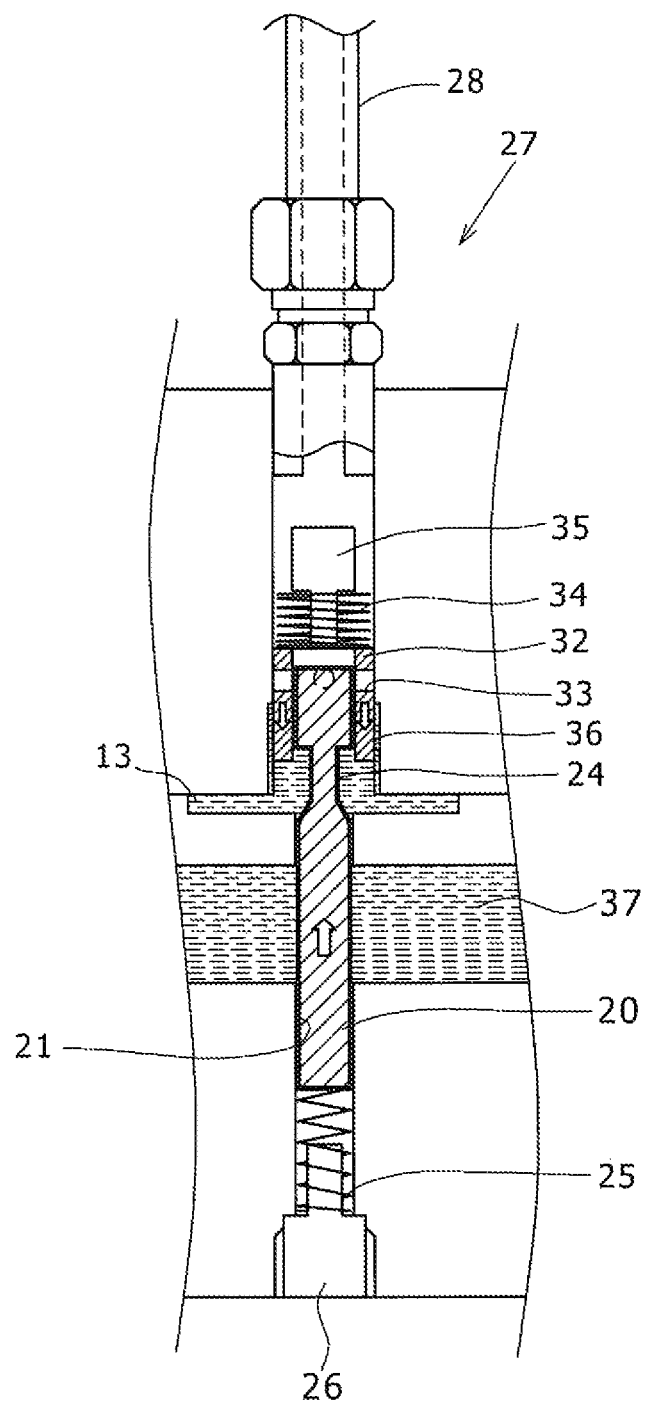
FIG. 13 is a partially enlarged view showing a structure and a movement of the liquid supply unit of the seventh embodiment.

As shown in FIG. 13, when a pressure on the tire support face 8 is sufficiently lowered, the piston 20 moves upward to shut off the circulation of the support liquid at the cut out 24, and the valve member 32 moves downward again by the effect of the second spring 34, and thus, it is possible to return to the initial state as shown in FIG. 10.

According to the flow rate adjustment means 27 of the seventh embodiment described above, it is possible to surely inhibit the piston 20 from being brought into the "kept opened state", even when the ground contact pressure becomes small under a condition that the piston 20 is in the OPEN state, since the valve member 32 is activated by the pressure loss of the support liquid which flows through the support liquid guide member 36.

In this connection, the structures and the functions/effects other than those described above of the seventh embodiment are the same as in the fourth embodiment. Therefore, explanation for such parts which are the same as in the embodiment will be omitted.

Incidentally, it is to be understood that the embodiments disclosed this time are exemplary in all aspects, and are not to be construed as limitations. In particular, in the embodiments disclosed this time, features not explicitly disclosed, such as driving conditions, operating conditions, every kinds of parameters, and dimensions, weights, or volumes of structures do not deviate from the range ordinary implemented by those skilled in the art, and values used therefor are those easily predictable by those skilled in the art.

Incidentally, as for liquid supply holes 10 disposed in a region where a tire is in ground contact whatever kind the tire made travel is, such as a center part in the upper face of the load support device 6, it is possible that such holes may be configured to be in a state of continually blowing out the support liquid, without provided with the pressure sensor 11 or the flow rate adjustment valve 12.

In regions which are symmetric with each other, such as those in the front-rear direction or in the right-left direction of tires, it is possible to manage the blowing out of the support liquid in an integrated manner, by making the settings or the controls of the pressure sensor 11 or the flow rate adjustment valve 12 in common.

In a state that there is no support liquid on the upper face of the load support device 6, there is a possibility that the pressure sensor 11 or the piston 20 cannot detect the presence or absence of a tire even if the tire is in ground contact. Therefore, it is also possible to supply the support liquid by a small amount from the supply holes 10, even when the above described liquid supply means 7 is in the "CLOSE" state, to continually generate a pressure of the support liquid in the gap between the upper face of the load support device 6 and the belt 5.

The present invention is based on the Japanese patent application No. JP 2013-117089 filed on Jun. 3, 2013, the content of which is herein incorporated by reference.

EXPLANATION OF REFERENCE NUMERALS

1: Traveling test device
3: Driving drum
4: Driven drum
5: Belt
6: Load support device
7: Liquid supply means
10: Liquid supply hole
11: Pressure sensor
12: Flow rate adjustment valve
27: Flow rate adjustment means
28: Water introduction tube
29: Pressure introduction tube

The invention claimed is:

1. A tire traveling test device comprising a belt which is horizontally spanned between two drums, and a load support device which supports a flat face of the belt from a side of lower face,
wherein the load support device is provided with a liquid supply means which supports the belt from below by supplying a support liquid between the load support device and the belt;

the liquid supply means comprising a liquid supply hole capable of discharging the support liquid between the load support device and the belt, in plural numbers along upper face of the load support device, and the liquid supply means being configured to be capable of adjusting a flow rate of the support liquid discharged from each of the liquid supply holes, on the basis of a fluid pressure on the upper face of the load support device which varies according to a ground contact state of the tire, wherein a flow rate adjustment means which adjusts the flow rate of the support liquid discharged from each of the liquid supply holes is provided separately from the load support device, and the plural liquid supply holes provided to the load support device and the flow rate adjustment means which adjusts the flow rate of the support liquid discharged from the plural liquid supply holes are linked by plural water introduction tubes.

2. The tire traveling test device according to claim 1, wherein the liquid supply means comprises a pressure sensor which is provided in plural numbers along the upper face of the load support device, and measures the fluid pressure on the upper face of the load support device.

3. The tire traveling test device according to claim 1, wherein the liquid supply means comprises a flow rate adjustment valve capable of adjusting a flow rate of the support liquid discharged from each of the liquid supply holes, by adjusting a valve opening degree on the basis of the fluid pressure on the upper face of the load support device.

4. The tire traveling test device according to claim 3, wherein the flow rate adjustment valve is configured to have a structure in which a force required in a valve closing becomes small compared to a force required in a valve opening motion.

5. The tire traveling test device according to claim 1, wherein
the flow rate adjustment means comprises a sensor which is provided separately from the load support device, and is capable of measuring a pressure or a flow rate of the support liquid on the upper face of the load support device; and
a flow rate of a support liquid passing through the water introduction tubes is adjusted on the basis of a measured signal of the pressure or the flow rate measured by the sensor.

6. The tire traveling test device according to claim 1, wherein the flow rate adjustment means comprises a flow rate adjustment valve which is capable of adjusting the flow rate of the support liquid discharged from each of the liquid supply holes by adjusting a valve opening degree on the basis of the pressure or the flow rate of the support liquid circulating through the water introduction tubes.

* * * * *